United States Patent

Tselikov et al.

BEST AVAILABLE COPY

[15] 3,680,345
[45] Aug. 1, 1972

[54] FLOATING, BLANK FEED AND TURNING MECHANISM FOR THIN WALL PIPE MILL

[72] Inventors: Alexandr Ivanovich Tselikov; Vsevold Vladiminsovich Nosal; Vadim Anatolievich Verderevsky, all of Moskow, U.S.S.R.

[73] Assignees: Vsesojuzny Nauchno-Issledovatelsky; Proektnokonstruktorsky Institute Metallurgicheskogo Mashinostroeniya, Moscow, U.S.S.R.

[22] Filed: May 25, 1970

[21] Appl. No.: 40,132

[52] U.S. Cl. .................................. 72/208, 72/250
[51] Int. Cl. .................................. B21b 17/10
[58] Field of Search........72/208, 209, 214, 220, 193, 72/250

[56] References Cited

UNITED STATES PATENTS 1,890,803  12/1932  Coe ............................ 72/208
3,411,336  11/1968  Wadleck ..................... 72/209

*Primary Examiner*—Milton S. Mehr
*Attorney*—Strauch, Nolan, Neale, Nies & Kurz

[57] ABSTRACT

A pipe blank feeding and rotating mechanism including a floating chuck, a mandrel rod end clamp and associated feed and turning gear mechanism is disclosed as a part of a cold rolling, thin-walled pipe mill assembly. The blank chuck has a through passage surrounding and enabling relative axial travel of a pipe blank over a mandrel rod. The chuck head has a shank by which it is mounted in a spindle which in turn is rotatable in a chuck body. The chuck head (and its shank) are axially spring biased to permit an increment of axial shift (float) of the head against spring bias relative to the spindle and body as a reaction to axially moving a pipe blank into the pipe blank rolling area. Self containing locking components coacting between the chuck shank and the chuck spindle permit disabling of the floating aspect. The mandrel end clamp has quick release, positive locking jaws which non-rotatably secure the clamp to the end of a mandrel rod, yet the clamp and the mandrel rod can be rotated. The mill has gear mechanism connected to the mandrel rod end clamp and to both the chuck spindle and to the chuck body to provide correlated rotation of the blank chuck head and mandrel rod clamp, and also, via the chuck body, to provide an axial feeding movement to the blank chuck.

21 Claims, 14 Drawing Figures

INVENTORS
ALEXANDR IVANOVICH TSELIKOV
VSEVOLD VLADIMISOVICH NOSAL
VADIM ANATOLIEVICH VERDEREVSKY

BY *Strauch, Nolan, Neale, Nies & Kurz*
ATTORNEYS

INVENTORS
ALEXANDR IVANOVICH TSELIKOV
VSEVOLD VLADIMISOVICH NOSAL
VADIM ANATOLIEVICH VERDEREVSKY

BY *Strauch, Nolan, Neale, Nies & Kurz*
ATTORNEYS

INVENTORS
ALEXANDR IVANOVICH TSELIKOV
VSEVOLD VLADIMISOVICH NOSAL
VADIM ANATOLIEVICH VERDEREVSKY

ATTORNEYS

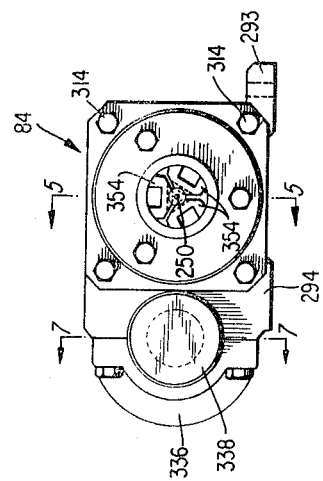

INVENTORS
ALEXANDR IVANOVICH TSELIKOV
VSEVOLD VLADIMISOVICH NOSAL
VADIM ANATOLIEVICH VERDEREVSKY

BY *Strauch, Nolan, Neale, Nies & Kurz*
ATTORNEYS

FLOATING, BLANK FEED AND TURNING MECHANISM FOR THIN WALL PIPE MILL

RELATED APPLICATION

This invention, which pertains to sub-assemblies and components for use in a cold rolling thin-walled pipe mill, is fully disclosed in applicants' co-pending application Ser. No. 529, on Method and Apparatus for Cold Rolling Thin Walled Pipe, filed on Jan. 5, 1970.

BACKGROUND OF THE INVENTION

Previously known cold rolling pipe mills have used mandrel rod end clamps as well as blank feeding and turning chucks. Insofar as the latter are concerned the blank feed chuck head has previously been axially fixed rigidly to its spindle and always shifted with the spindle and chuck body. Some prior art construction and methods of using pipe mill feed components are disclosed in the text "Cold Rolling Pipe Mills" by Shebakin, Yu. A. et al., Metalurgizdat 1966 published in the Soviet Union. Since that publication, the pipe blank handling mechanisms of pipe mills as well as the pipe blank feeding methods used in cold rolling thin-walled pipes have undergone considerable development with resultant improvements such as reflected in the present invention.

SUMMARY OF THE INVENTION

The primary object of the present invention resides in improved pipe blank handling mechanism including correlated mandrel end clamp and pipe blank feed and turning chuck construction for use in mills for cold rolling thin and superthin-wall pipe.

The novel floating chuck, which grips the pipe blank and manipulates and step feeds the blank over an axially fixed mandrel into and through a rolling zone, makes it possible to carry out the rolling reduction of the wall thickness in a "floating" regimen. This improvement plays a decisive role in the satisfactory and efficient rolling of thin-walled pipe, particularly of acceptable super thin-walled pipe. It enables economically important avoidance of substantial waste material, considering that the floating feed feature is primarily intended to be used in mills for the rolling of thin-walled, superthin-walled, and finned pipes during which, end portions are crushed and distorted when conventional feeding methods and mechanisms are used.

Further objects reside in the provision of a novel pipe blank feed and rotating chuck assembly in which the blank chuck mechanism is mounted in the feed body in a manner enabling an axial float of the pipe blank chuck head against a resilient bias force under reaction forces created on the pipe blank during a feed step. In conjunction with the axial float provision, novel camming mechanism is provided to positively shift the chuck head, in a direction counter to any float shift which had previously occurred, whenever a blank rotation step is completed yet, once the rotation step has occurred, the components are again in a position enabling axial float. In further conjunction with the foregoing, the pipe mill drive mechanism is correlated to provide a predetermined angle of blank chuck rotation directly correlated with the construction of the camming mechanism used to counteract the floating shift.

A further object resides in providing a mandrel rod end clamp of improved construction wherein the end clamp is rotatable and includes correlated radially shiftable clamp jaws with comb shaped jaw teeth and a simple operating spider which has two positions enabling shifting and locking of the jaws in either an open or a closed condition. Each tooth in each jaw comb has a flat face transverse to the axially disposition of the mandrel rod, and the teeth coact and grip complementary flat transverse comb teeth and depressions in the end of the mandrel rod. The improved clamp enables an accurate axial fixing of the mandrel yet, because the flat toothed clamp jaws non-rotatably engage the end of the mandrel rod, rotation of the clamp will result in direct rotation of the mandrel rod.

A still further object resides in the novel provision of correlated drive mechanism which provides the same angular rotation steps for the blank feed and rotation chuck as for the mandrel rod end clamp, enabling axial shift and angular rotation of a blank and at the same time keeping the mandrel rod and the pipe blank non-rotatable relative to each other.

Further novel features and other objects of this invention will become apparent from the following detailed description, discussion and the appended claims taken in conjunction with the accompanying drawings:

BRIEF DESCRIPTION OF DRAWINGS

A preferred structural embodiment of this invention is disclosed in the accompanying drawings, in which:

FIG. 5 is a side view of the rear end mandrel rod clamp assembly with the clamp shown in sectional view taken on line 5—5 of FIG. 6. A part of the operating lever is shown in phantom and an arm of the fork is broken away so as not to obscure the sectioned detail;

FIG. 6 is a rear end view of the mandrel rod clamp shown in FIG. 5;

FIG. 7 is a section view taken on line 7—7 of FIG. 6 showing details of the driving pinion used to incrementally turn the mandrel rod;

FIG. 8 is a section view taken on line 8—8 of FIG. 5, illustrating the mandrel rod clamp jaws;

FIG. 9 is a perspective view of one of the mandrel clamp jaws;

SPECIFIC DESCRIPTION

Figure 1A:
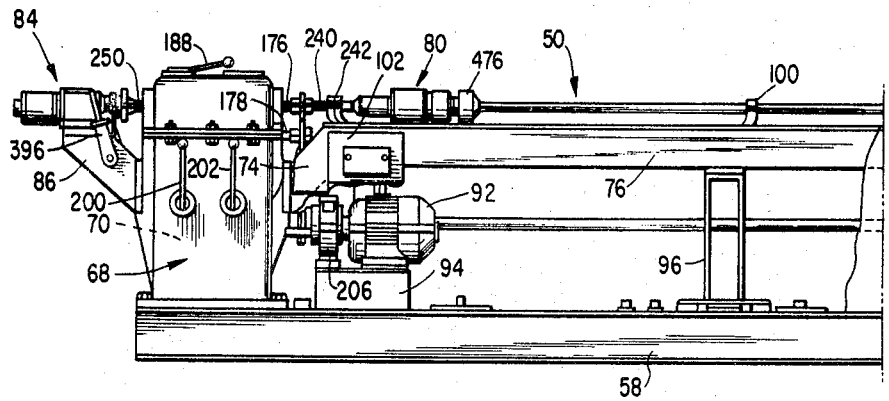
FIGS. 1a and 1b, viewed together will be referred to as FIG. 1 which illustrates in side elevation a pipe mill incorporating a floating, blank feed chuck and mandrel clamp made in accord with this invention.
Figure 2A:
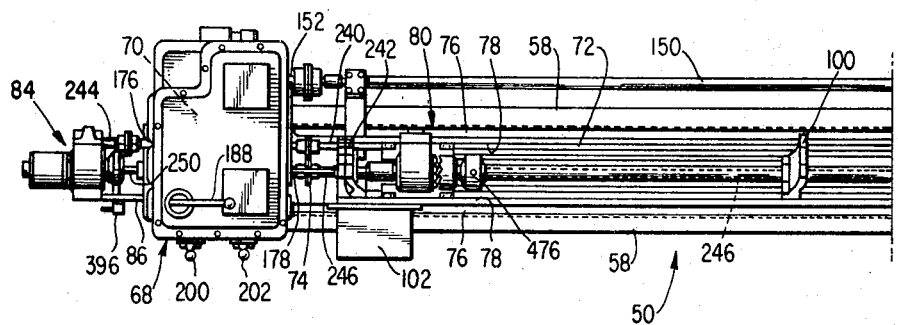
FIGS. 2a and 2b, also viewed together will be referred to as FIG. 2, illustrating in plan view the pipe mill seen in FIGS. 1a and 1b.
Figure 1B:
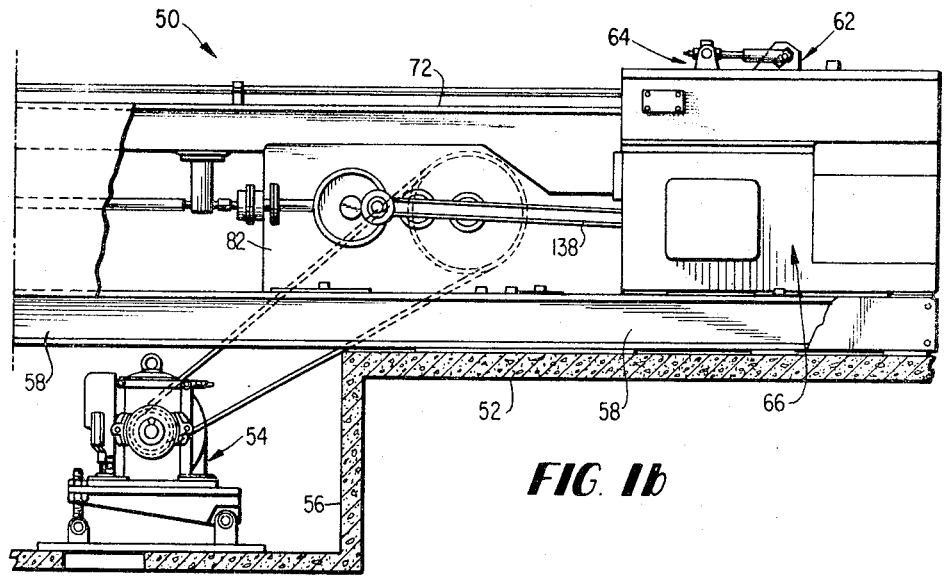
Figure 2B:
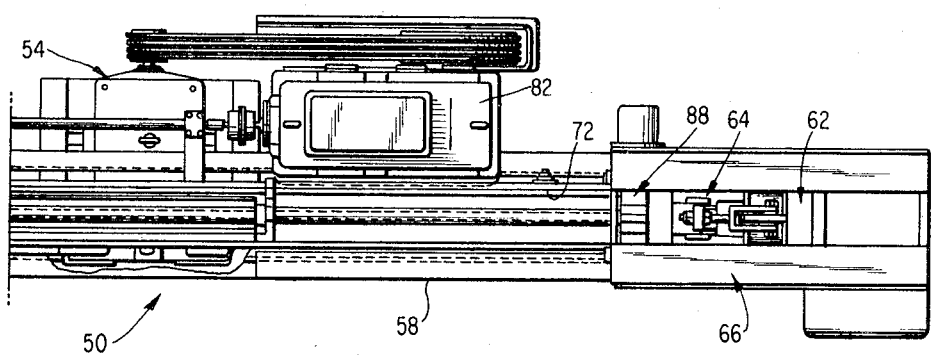

With reference to FIGS. 1 and 2, a pipe mill using the floating, blank feed and turning mechanism and the mandrel end clamp will be generally described. Details of other components of the mill are described in co-pending application Ser. No. 529. Most of the drawing figures are reproduced from working drawings and can be scaled for relative dimensions. As the description proceeds, by referring to the diagrammatic illustration of FIG. 3, the functional interrelationship of the mechanisms can be better understood.

The pipe mill 50 disclosed in the drawings, has been used in producing thin-walled pipe with O.D. of from 8-15 mm. and includes a number of sub-assemblies supported by the mill floor or foundation 52. Main power is furnished by a plural speed electric drive motor 54 which can be located in a well 56 under the other pipe mill components which are supported on several heavy steel I-beams 58 resting on and secured to the mill floor. A rolling stand 62 is located at the front end (right hand end of the drawings) of the mill and, with a rocking lever assembly 64, is mounted in a front mill housing 66 in a manner enabling the rolling stand to be reciprocated back and forth by the rocking lever, as described in detail in the aforeidentified co-pending application.

As the left-hand end of the mill, a rear housing 68 is secured to the I-beam bed and contains feeding and turning gear mechanism 70 which is part of the drive path from motor 54 to the mandrel clamp assembly and the floating blank chuck 80. The front and rear housing 66 and 68 are rigidly secured to and provide end support for the intermediate or mill table 72 which includes a heavy cast rear end brace 74 and parallel longitudinal beams 76 to which are fastened parallel channel track slideways 78 forming guide tracks for the "floating" blank feed chuck 80 which travels from a position adjacent the rear housing to a location adjacent the front housing in feeding a pipe blank to the rolling stand.

Seen between the main motor 54 and front housing 66 is a third housing 82, offset to one side but rigidly secured to the I-beam bed. Housing 82 contains reduction and drive transfer gearing from the motor drive to the rocking lever and the blank feed mechanism.

At the extreme rear end of the mill, the input end is the mandrel rod clamping mechanism 84 which is rigidly fastened to the rear wall of housing 68 by a heavy welded steel cantilever support 86.

Looking again at the front end of the mill as shown in FIG. 2, an intermediate blank clamp assembly i8 can be seen near the rear end of the rolling stand housing 66.

Near the left hand side of FIG. 1, a second drive motor 92 is secured under the table on a support frame 94. Auxiliary motor 92 is used for speeded up feed-in and return movement of the blank feed chuck 80.

Suitably located along the length of table 72, one or more welded steel stands 96 provide rigid support for the table, as necessary. Appropriate sheet metal cowling can enclose the sides of the intermediate frame or table area. Blank pipe supports 100, which can be shifted and removed, are used along the table to help support the mandrel spindle and blank, in a manner well-known in the pipe mill art.

Main and auxiliary mill control panels located on the side of the table near the rear and front ends include various electrical control switches and indicator lights to operate and indicate mill condition.

Figure 3:
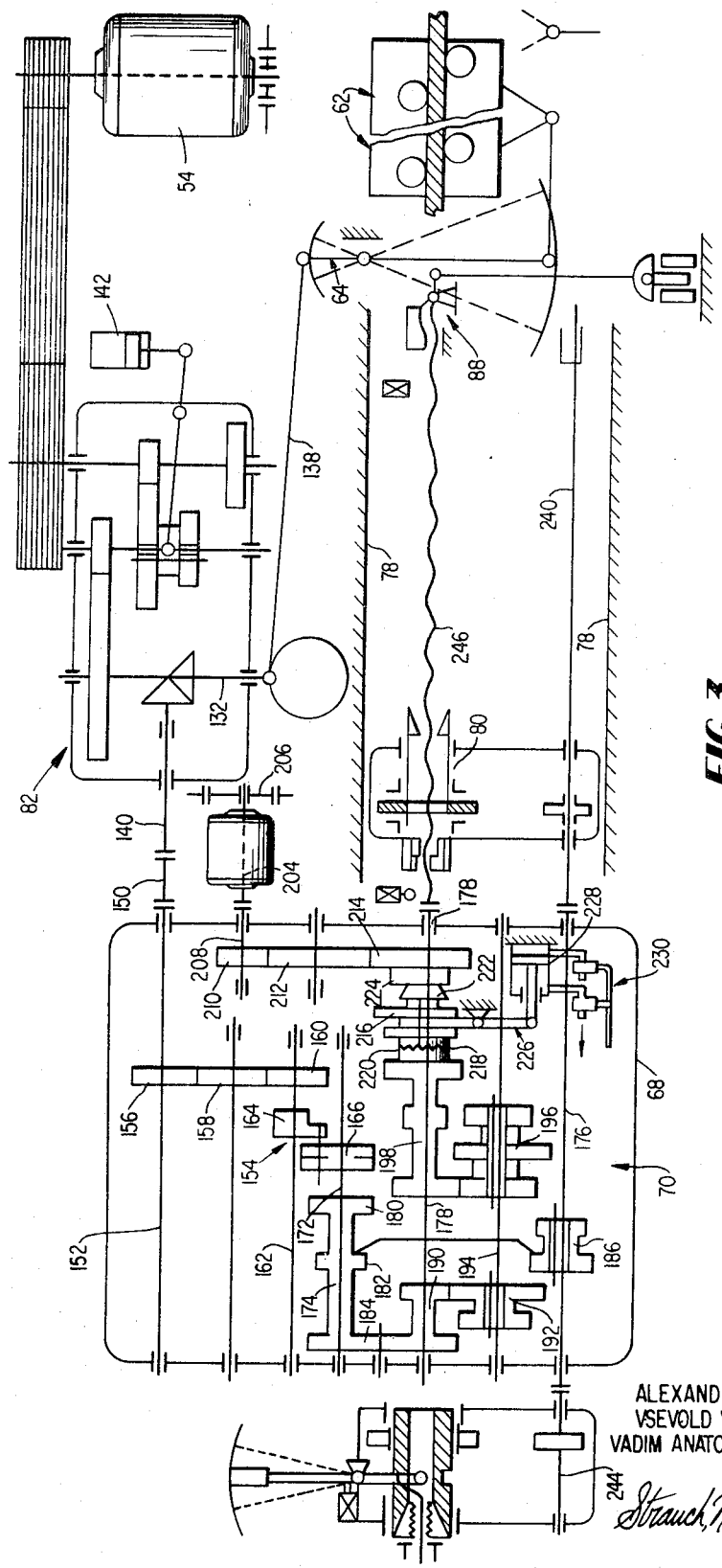
FIG. 3 is a diagrammatic representation of the power and drive transmission mechanism in the mill shown in FIGS. 1 and 2.

The drive mechanism is best understood with reference to FIG. 3 with supplemental reference to FIGS. 1 and 2. Drive power is derived from the two electric motors 54 and 92. Switching between desired ones of the three speeds of the electric motor 54 is carried out, as required, by conventional control circuitry. By providing variable motor speed, greater versatility is enabled in cold rolling operations, permitting the pipe mill to roll thin-wall pipes made from a number of different metals and alloys.

Drive power is transmitted from main motor 54 through pulleys and belts to the reduction transmission 82. Once the mill is in normal operation, drive power for the rolling operation within the reduction transmission is transferred through shifting gears to a crankshaft 132 connected to the rocking lever assembly 64 by a connecting rod 138.

A second power output is via shaft 140 which projects rearwardly from the reduction transmission 82 to provide primary drive power to the blank feeding and turning mechanism 70.

Inside the reduction gear housing 82, a pneumatic motor 142 is used to shift the gears to furnish a special high speed feed-in drive for moving an initial pipe blank up to the rolling stand.

Drive power for the blank feeding and rotating mechanism 70 is accomplished by means of the main electric motor through reduction gearing 82 and transmission output shaft 140 drive coupled to a long drive shaft 150 which in turn is coupled at its rear end to an input shaft 152 for the blank feeding and turning mechanism 70.

Figure 4:
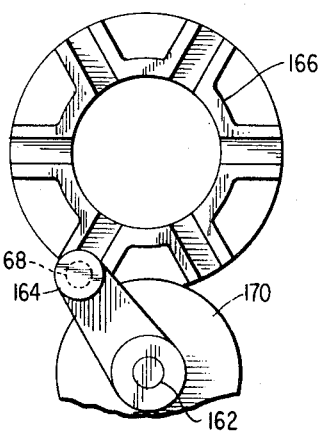
FIG. 4 (on sheet 2) is an illustrative drawing of the Geneva feed used in the feeding and turning mechanism.

The exemplary mill rolling operation requires intermittent feeding and turning of the pipe blank with associated turning of the mandrel rod, accurately correlated with a specific increment of the rocking cycle of the rolling sand 62 (its extreme rear position). This accurate correlation is enabled by means of a single geneva ("Maltese Cross") drive transfer assembly 154. Geneva drive derives from the continuously rotating input shaft 152 through gear 156, an idler gear 158 and a gear 160 drive connected to the geneva drive input shaft 162. Shaft 162 carries and rotates the geneva crank 164. A six slot "Maltese Cross" wheel 166, such as used in the present invention, is shown in FIG 4 and is subjected to periodic stepped rotation by the crank 164 through its roller cam 168 (see FIG. 4). When not being step driven by the crank the "Maltese Cross" is locked by a conventional locator or blocking plate 170. The geneva crank 164 and locator plate 170 are continuously rotated at a number of revolutions per unit time equal to the number of double passes or cycles of the rolling stand 62. When the rolling stand is approaching its extreme rear position, the geneva crank roller cam 168 enters a slot of the cross 166 and rotates it one step, which with with the six slot cross is 60°. The rotation of the cross is terminated at the beginning of the straight rolling pass of the stand.

The geneva output cross 166 is drive connected to a shaft 172, to which is splined an axially fixed gear cluster 174 which provides a selected one of two angular amounts of incremental rotation of the blank rotating drive shaft 176 (58°10' or 72°) and also causes different numbers of rotations of the feeding screw drive shaft 178. The gear cluster 174 includes three gears 180, 182 and 184 which rotate as a unit and two of the gears, 180, and 182 are used in conjunction with the shifting gear cluster 186 splined to turning shaft 176 to provide the two different increments of rotation (58°10' or 72°), for reasons which will become apparent as the description proceeds. Gear cluster 186 is shifted by a gear shift lever 188 (Figures 1a and 2a) on the top of rear housing 68.

The blank feed chuck drive is via a step up gearing from gear 184 of the gear cluster 174. Gear 184 meshes with a two gear idler cluster 190 journalled on the feed shaft 178, and drive is transmitted through a shiftable gear cluster 192 splined to transfer shaft 194, thence through a second shiftable three gear cluster 196, also splined to transfer shaft 194, to a selected one of a three gear cluster 198, rotatably mounted on and operable to drive the feed screw shaft 178 as will be described hereinafter. The shiftable two gear cluster 192 is selectively meshed with one of the gears on cluster 190 and the shiftable three gear cluster 196 is selectively meshed with an associated one of the gears on the cluster 198 by means of the two gear shift levers 200 and 202 (FIGS. 1a and 2a) located on the side of rear housing 68, providing six step-up gear ratios in the drive to the feed screw drive shaft 178 during each cycle of rolling stand reciprocation.

HIGH SPEED FEED SCREW OPERATION

Under certain conditions, high speed continuous rotation of feed screw drive shaft 178 is desired, e.g., feed-in of a pipe blank when the first blank is introduced at the start of mill operation and return of the floating chuck assembly 80 to its rear start position when a succeeding pipe blank is fed into the mill. The auxiliary electric motor 92 with conventional reversing controls (not shown) furnishes the drive power for high speed feed shaft rotation. The auxiliary high speed power drive train is via the auxiliary motor shaft 204 which is drive connected through a brake 206 (FIG. 1a) to an input shaft 208 journalled in the rear mill housing 68. From input shaft 208 the auxiliary power is transmitted through a gear 210 on the shaft 208 thence through an idler gear 212 to a friction clutch input gear 214 rotatably journalled on the feed screw drive shaft 178 adjacent the feed shaft gear cluster 198. Located on and slidably splined to feed screw shaft 178 is a shiftable coupling member 216. One face 218 of coupling 216 has jaw clutch teeth which, when the coupling is shifted to one position (normal speed), will positively mesh with the jaw clutch teeth on a clutch face member 220 rigidly secured to the gear cluster 198. This condition enables feed screw drive derived from the main motor through the incremental geneva drive 154. The other face 222 of coupling member 216 is a conical friction surface which can mate with an internal conical surface of a coupling face 224 on the clutch input gear 214.

Coupling member 216 is selectively shifted from one to the other of the two positions by a shifting lever assembly 226 actuated by a pneumatic motor 228 controlled by solenoid operated valves 230, in turn controlled through suitable control circuitry.

The ends of the blank turning shaft 176 project from the front and rear of the rear mill housing 68, being offset to one side from the axis of the pipe blank path, as seen in FIG. 2a, and it is aligned with and its front end is drive coupled with a long, blank turning shaft 240 extending substantially the length of the mill. Shaft 240 is journalled near its rear end in a bearing block bracket 242 and at its front end in a bearing assembly on the intermediate blank clamp assembly 88, as is described in said co-pending application. The long, blank turning shaft projects through the floating chuck assembly 80 and is slidably drive coupled thereto in a manner to be described hereinafter.

The projected rear end of turning drive shaft 176 is coupled with an aligned mandrel clamp turning shaft 244 enabling an incremental turning of the mandrel clamp (as well as the mandrel spindle) conjointly with turning of the blank as will be hereinafter more fully described.

The feed screw drive shaft 178 projects from the front side of the rear mill housing and is aligned and drive coupled with a long, feed screw 246 extending substantially the length of the mill and disposed directly under the axis of the pipe blank feed path. The feed screw 246 is journalled against axial movement in tapered roller thrust bearings located in the rear bearing block bracket 242 and, at its front end, in the intermediate blank clamp assembly 88. The feed screw 246, intermediate its front and rear journal portions, is threaded and is turned through a feed nut 442 (see FIGS. 10 and 11) in the base of the floating chuck assembly 80, so that rotation of the feed screw 246 will feed the floating blank chuck assembly forward and backward.

In the cold rolling pipe mill operation being described, a mandrel head 252 (FIG. 5) made from steel and shaped to conform with the desired inner diameter of the finished pipe is axially maintained in a predetermined axial position disposed within the rolling stand 62. A long mandrel spindle or rod 250 (see FIG. 5) extends from the mandrel clamp assembly, which securely clamps the rear end of the rod, along the feed path axis, through the floating blank chuck 80, along the length of the table 72, through the intermediate clamp 88 and into the rolling stand 62 where it carries the mandrel head 252. In this mill, only one mandrel rod clamp is used. In order to keep the mandrel rod 250 from axially shifting when added blanks are fed into the mill, an intermediate blank clamp 88 is used and it is situated directly to the rear of the rolling stand. Using the intermediate clamp 88, the unfinished end of the pipe blank which has been almost completely rolled and formed, is clamped about its outside surface and the blank in turn axially maintains the mandrel rod against movement when the mandrel end clamp 84 is released to permit sliding a new blank onto the mandrel rod. When the new blank clears the mandrel rod clamp, that clamp can be closed, and when the mandrel rod clamp is closed the intermediate clamp will automatically release the leading blank. The blank clamp works when the mandrel rod clamp is open and, vice versa, it is always released and will not work when the mandrel rod clamp is closed.

MANDREL ROD CLAMP

Details of the mandrel rod clamping mechanism 84, seen in FIGS. 1 and 2 at the rear end of the pipe mill, are disclosed and now described in detail with reference to FIGS. 5–9.

The mandrel rod clamp serves to immobilize the mandrel via its rod 250 in the axial direction and at the same time to transfer to the rod, a synchronous rotation together with the blank, by the same angle, whenever the blank undergoes an incremental turn during a cycle of rolling stand operation. As has been described, the mandrel clamp mechanism 84 is mounted by means of a welded steel rigid cantilever bracket assembly 86 against the rear wall of the rear mill housing 68 (FIG. 1). Viewing FIG. 5, screws 286 fasten the cantilever bracket base plate 288 to the rear housing, and an upper bracket shelf plate 290 supports a shim plate 292 and the base flange 293 of a cast steel, hollow, mandrel clamp housing 294. The housing base flange 293 and the shim plate are keyed together for accurate fore and aft alignment of the clamp and together are secured on shelf 290 by screws. Front and rear recesses 296 and 298 in housing 294 receive roller thrust bearings 300 and 302 which journal the hollow shank 304 of an enlarged jaw casing 306 made from steel. Apertured cover plates 308 and 310 fastened by screws 312 on the front and rear of clamp housing 294 retain the thrust bearings 300 and 302 in their respective housing recesses.

Rigidly retained between the two bearings 300 and 302 is a spur gear 316, non-rotatably secured to jaw housing shank 304 by a drive key 318. The threaded front end 320 of the hollow shank receives lock nuts 322, which, with a spacer sleeve 324 abutting the inner race of rear bearing 300 and shank shoulder 326 abutting the inner race of rear bearing 302, rotatably mount and maintain the jaw casing 306 against axial shift. The far side of housing 294 has an opening into the space around spur gear 316 and provides spaced apart bearing retainer blocks which retain roller bearings 330 and 332 (FIG. 7) journalling the aforedescribed mandrel turning shaft 244. Between bearings 330 and 332 a spur gear 334 is keyed to the shaft 244 and, in assembly, is meshed with the jaw casing spur gear 316. A combination bearing retainer cap and gear space cover 336 is secured on the side of housing 294 by screws and retains the bearings, the end of shaft 244, gear 334, a grease cap 338 and a flanged shaft seal 340, in assembly. Suitable grease fittings (not shown) enable manual or automatic injection of lubricant into the gear and bearing housing.

Returning to FIG. 5 and with reference to FIG. 8, jaw casing 306 is a cylindrical steel body with the integral forwardly projecting hollow shank 304. Casing 306 has three equi-angularly spaced slots 344 which radiate from a large diameter bore 346, coaxial and coextensive with a bore 345 through its shank 304. Shank 304 has shallow counterbore recesses receiving anti-friction sleeve bushings 350 and 352. Housing slots 344 serve as guide tracks, for clamping jaws 354 and a jaw operating spider 356, extending forward from the rear face 357 of jaw casing 306 to locations closely adjacent the front wall of the casing and radially outward from the bore 346 to axially disposed flat guide surfaces 358 near the outer circumference of the casing.

The rear face 357 of casing 306 serves as an axial abutment surface for the jaws, as will be described, and is recessed within an annular, axially extended rear casing flange 360 which receives, and to which, a rear casing wall 362 is secured by screws. The rear wall 362 is apertured and has slotted recesses which match and are coextensive with the casing bore 346 and the three casing slots 344. The wall also has a peripheral flange 364 which, in assembly, abuts the annular casing flange and accurately determines the axial spacing between the front face 366 and the wall and the rear casing face 357 to provide an annular space which slidably receives flanged abutment 378 on the jaws 354.

The mandrel clamp operating spider 356, made from steel, can be seen in FIGS. 5 and 8, and includes a forwardly-projected sleeve spindle 370 having an inner through passage dimensioned to permit a free fit, through passage of pipe blanks inserted through the rear wall aperture and on completely through the mandrel clamp assembly. Integral with and at the rear end of the spindle 370 are three radially disposed camming arms 372 each outwardly offset, shaped to fit in spaced relationship from the sides of and dimensioned to permit an axial reciprocation within the casing slots 344. The outer surface of each spider arm 372 slidably engages the flat outer guide surface 358 in its respective slot 344 and each arm includes two camming slots 374, shaped to cam a jaw pin 376 radially inward and outward between two positions. Clearly illustrated in FIG. 5, the cam slots 374 are shaped at each end to positively maintain the pins 376 in an outward or inward disposition, i.e., at those positions the cam slots are shaped so the pins cannot exert a reversed camming effect on the spider.

Prior to inserting the spider 356 into assembly in the casing, a clamp jaw 354 (see FIG. 9) is assembled to each of the spider arms 372. The jaws are made from hardened steel, are channel shaped to slidably fit on an associated spider arm 372 and to slidably fit within the casing slots 344, as seen in FIGS. 5 and 8. The rear end of each jaw 354 has two integral lateral abutment flanges 378 which are received with a close sliding fit into the space between the casing rear face 367 and face 366 of the casing rear wall and thereby accurately locate and maintain the axial position of the mandrel clamp jaws relative to the pipe mill rolling stand. The channel body of each jaw has laterally disposed apertures 380 through both channel flanges and when the jaws are placed on each of the spider arms 372, camming pins 376 are inserted with a force fit through the adjacent jaw apertures 380 and with a freely slidable fit through the spider arm cam slots 374. So assembled, each of the three spider arms 372 carries a clamping jaw and the three jaws can move radially toward or away from each other depending upon the axial relationship of the cam slots to the cam pins. The facing surfaces of each jaw 354 have several (three shown) heavy comb teeth 382 with flat outer faces which, in assembly, are arranged essentially as the sides of an equilateral triangle.

The spider 356 together with the three jaws 354, is inserted into bore 348 of shank 304 with the jaws radially slidable and the spider arms axially shiftable in the casing slots 344 and the rear casing wall is then secured to the casing body. So assembled, the spindle can be shifted forward from the illustrated position and the camming slots will shift the clamp jaws 354 radially outward to an open condition. A rearward shift of the spindle will cam the jaws 354 radially inward to a closed condition. In a closed condition, the jaw combs 382 close into a triangular clamping condition, fitting into accurate, correlated mating comb recesses 384 in the end of a mandrel rod 250 to thereby axially locate and clamp the mandrel rod against axial shift and also to secure the mandrel rod against rotation relative to the mandrel clamp. Thus, when the mandrel clamp is rotated, the clamped mandrel rod will rotate coincident with the clamp.

The front end of spider spindle 370 projects beyond the end of the casing shank 304 and is used to selectively reciprocate the spindle, To enable operative reciprocation, a spindle shifting sheave 388 is secured on the projected end of the spindle, and the arms 380 of the shifting fork assembly 391, fixed on a shaft (not shown) which is journalled between the cantilever support brackets 86, fit into the groove of the shifting sheave. Rigidly keyed to the fork assembly shaft is a gear 392, FIG. 5, and a switch operating arm 394. Fork assembly 391 is operatively rocked by a lever 396 secured on a shaft 398 which is also journalled between the plates of cantilever support 86. A gear (not shown) on the lever shaft 398 meshes with the fork assembly gear 392, so operation of lever 396 will rock the fork assembly 391 thereby reciprocating the spider spindle 370. Lever 396 has a spring loaded detent or latch pin 400, operated by a thumb button 403, which engages one or two slots 404 and 406, in a latch plate 408 fastened by screws to the side of the cantilever support bracket.

Figure 12:
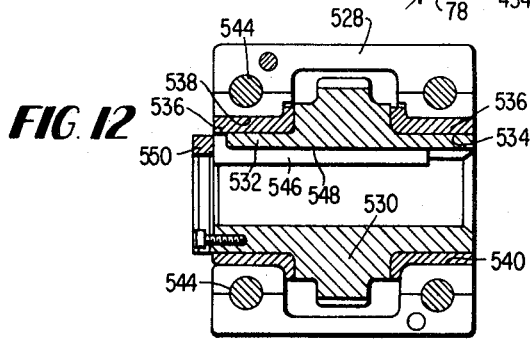
FIG. 12 is a section view taken on line 12—12 of FIG. 11 showing details of the driving pinion used to incrementally rotate the blank feed chuck.

When lever 396 is located in the disclosed position in FIG. 5, spider 356 is disposed in its rear position, i.e., with jaws 354 in a clamping condition and when the lever is shifted counterclockwise to its rear latched position, the fork assembly rocks forward, reciprocating the spider forward and the clamping jaws shift radially outward to a released condition, wherein the jaws are opened sufficient to pass a pipe blank. As seen in FIG. 12, when the clamp is shifted to a released condition the fork shaft and hence the switch lever 943 are rocked clockwise, pressing the actuator button 412 of a terminal switch 410 which controls a circuit that prevents operation of the main motor 54.

The pipe mill uses one mandrel rod clamp and its jaws 354, spider 356 and cast jaw casing 306 are rotatable as a unit by means of the gears 334 and 316 driven by the mandrel turning shaft 244, the effective continuation of the blank rotation drive shaft 176. As has been described, when the jaws are closed the flat face jaw teeth enter the flat bottom slots of the rod comb and triangularly clamp the mandrel rod against rotation relative to the clamp as well as rigidly maintaining the rod against axial displacement. Accordingly, when the blank turning drive shaft is rotated through a predetermined angle, the mandrel clamp, the mandrel rod and the mandrel head are also turned through a predetermined angle, which is equal to that through which the blank is turned by the floating, blank chuck, as will hereinafter be more fully described.

FLOATING CHUCK FOR BLANK FEEDING AND TURNING

The floating chuck assembly 80 is described in detail with reference to FIGS. 10, 11 and 12. As has been hereinbefore generally described, relative to FIGS. 1, 2 and 3, in the exemplary pipe mill environment, the floating chuck assembly clamps and holds the pipe blank during the rolling process, and while the blank is clamped, the assembly step feeds and rotates the pipe blank when the rolling stand is in the extreme rear portion of its cycle of operation, during which time period the rollers are not in contact with the rolled pipe. The chuck assembly 80 can travel the length of table 72, guided by channel tracks 78 which assure that the axis of the floating chuck coincides with the mandrel axis which is also the feed path axis. Feed movement of the chuck is derived from stepped rotation of the feed screw 246 and rotation or stepped turning, of the chuck is derived from the long, chuck turning, grooved shaft 240. Both shafts have operative engagement with the chuck assembly throughout its path of travel.

Figure 10:
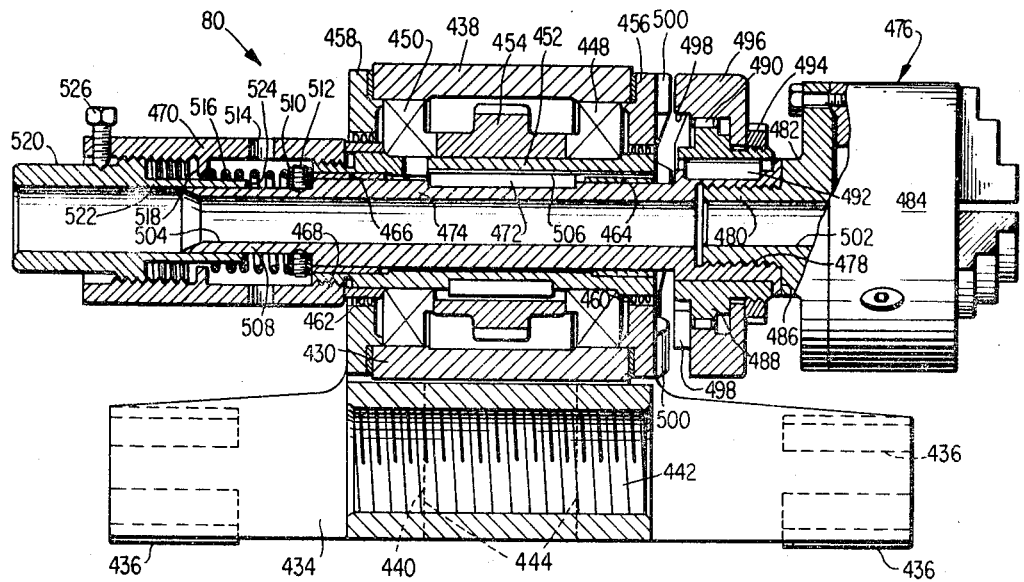
FIG. 10 is an enlarged, essentially vertically sectioned view of the "floating" blank feed and rotating chuck.
Figure 11:
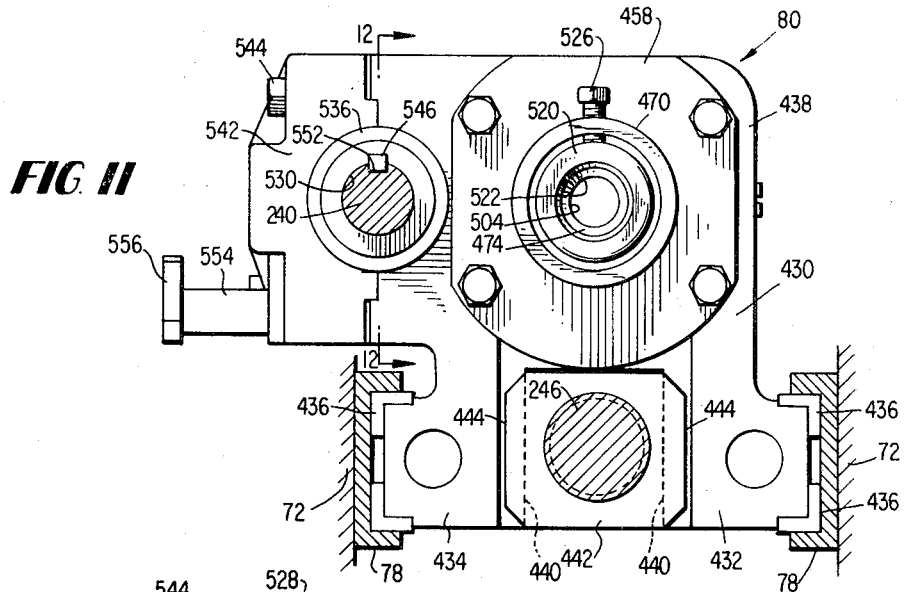
FIG. 11 is a rear end view of the blank feed chuck shown in FIG. 10.

Turning to FIGS. 10 and 11, the various components of the floating chuck assembly 80 are shown as assembled on a cast steel housing 430. The bottom part of the assembly housing has two parallel, heavy support flanges 432 and 434 extending fore and aft and spaced laterally from each other. Fastened, as by screws, to the upper and lower outer edges at each corner of both of flanges 432 and 434 are slideway guides 436 made from angle pieces of bearing bronze or the equivalent. The housing is placed in the mill table with the two base flanges received in the slideway channel tracks 78 which cooperate with the slideway guides to securely maintain the chuck assembly 80 against rotation around and against deviation from coincidence with the mandrel axis, yet permit its free sliding movement along the mandrel (feed path axis). Suitable manual or automatic lubrication of the slideway guides 436 is provided and can be accomplished by any of many well known expedients.

The hollow upper part 438 of housing 430 is a gear and bearing container and bridges the space between the base flanges, the facing surfaces of which are machined to provide a feed nut retainer 440. A "square" feed nut 442, with end flanges 444, shaped to be slid up into the housing retainer 440 and prevent axial as well as rotational deviation of the nut relative to the housing, is located between the housing flanges. The aforedescribed feed screw 246 is threaded through nut 442 so its rotation will move the floating chuck assembly along its feed path.

Received within front and rear recesses of the upper housing body 438 are taper roller bearing sets 448 and 450 which journal and axially maintain a spindle sleeve 452. A spur gear 454 is carried on and keyed to spindle 452 within housing body 438, the spindle, gear and bearing sets being secured in assembly by apertured housing body, end covers 456 and 458 made from steel, which are fastened to the housing by screws. Spindle grease seals 460 and 462 are carried in the cover apertures to retain lubricant within the housing body. The inside surface at each end of the gear spindle sleeve 452 is undercut to receive anti-friction bushings 464 and 466. The front end of the gear spindle terminates at the cover 456, but the rear spindle end 468 projects through and beyond rear cover 458 and carries a steel, cylindrical, adjustment chuck body 470 which can be suitably secured thereto as by threads and set screws.

Slidably disposed through the gear spindle sleeve 452 and non-rotatably coupled thereto via a long keyway 506 and a key 472, is the sleeve spindle 474 of the blank chuck 476. Key 472 is received in a recess in spindle 474. The front end of chuck spindle 474 is internally threaded at 478 to receive the hollow threaded post 480 of a chuck flange 482 to which is fastened, by screws, a manually operated three-jaw clutch head 484, of the conventional lathe type.

At its extreme front end a slightly enlarged portion of chuck spindle 474 terminates in a radially flanged abutment 486. Force fit on the enlarged spindle end, and abutted against the rear shoulder of abutment 486, is a boss 488 having outer peripheral splines 490. A key 492 non-rotatably locks the spindle to the boss. Retained by a round nut 494 and splined to the splines 490 on boss 488 is a cam plate 496 with five equi-angularly spaced, axially facing, camming ratchet teeth 498 on its side which faces the housing cover 456. The facing wall of cover 456 includes five mating ratchet teeth 500.

The blank chuck head and its spindle 474 have axial through bores 502 and 504 whose inside diameters enable free through passage of the pipe blanks fed into the mill. The chuck spindle 474 with its key 472 is assembled through the front end of the housing and, as has been hereinbefore described, is keyed with a sliding fit between key 472 and the long internal keyway 506 of gear spindle sleeve 452, and slidably engaged with the bushings 464 and 466. A reduced diameter rear end 508 of chuck spindle 474 projects beyond the rear end 468 of the gear spindle and into the adjustment chuck housing 470 and inside of that housing an abutment ring 510 is secured by set screws 512 at a predetermined position on the chuck spindle end 508. The ring 510 determines the limit of forward axial shift of the blank chuck and spindle to its ratchet free position as depicted in FIG. 10, yet permits a rearward shift of the chuck and spindle to its ratchet engaged position wherein the teeth 498 on the rotatable chuck spindle mate with the stationary housing teeth 500. The abutment ring set screws 512 are accessible through apertures 514 in the adjustment chuck housing 470.

A compression coil spring 516, located inside the adjustment chuck housing 470, has one end seated against the abutment ring 510 and the other end against an internal flange 518 in the chuck to provide a strong resilient force biasing the blank chuck and spindle to their forward limit position in which there is clearance between the rotatable part with teeth 498 and the stationary teeth 500.

To eliminate the spring bias floating mode of the blank chuck, i.e., to maintain the chuck head in a rigid axial disposition, the adjustment chuck includes a hollow adjusting nut 520 screw threaded into the rear end of the adjustment chuck housing 470. Nut 520 includes an internally projected sleeve 522 which slides over the rear end 508 of the chuck spindle, provides an abutment end 524 and also pilots into the coils of compression spring 516, helping to center the spring. By turning the nut 520 into chuck housing 470 until its inner end 524 abuts the spindle abutment ring 510, the nut can tightly clamp the ring against the rear end of the gear spindle sleeve 452, thus clamping spindle 474 with its blank chuck 476 in a fixed axial position relative to the floating chuck housing 430. The outer part of nut 520 is maintained in adjusted positions by a set screw 526.

Shown in FIGS. 11 and 12, the far side of the upper body 438 of the floating chuck housing has an opening defined by a gear journal pad 528, and receives a pinion gear 530 with integral hollow stub axles 532 and 534. Flanged annular bushings 536 fit over the gear axle stubs and seat in bushing recesses 538 and 540 in the housing journal pad and correlated bushing recesses in a journal cap 542 secured to the housing body 438 by pins and screws 544. A locking key, 546, placed in an internal gear keyway 548 is held in place by a retainer end ring 550 fastened on the end of stub shaft 532 by screws. The gear 530 is slidably disposed on the grooved turning shaft 240 and is coupled for rotation thereby by disposition of the gear key 546 in the turning shaft groove 552.

Secured on the side face of the journal cap 542 is an auxiliary support 544 which carries a limit switch operator 556 used to determine the limits of travel of the floating clutch assembly by actuating control circuit limit switches at each end of the table at the limits of the pass of the floating chuck assembly.

The stationary mandrel spindle 250 projects through the aligned spindle and chuck bores 504 and 502 and is axially fixed by the mandrel clamp 84. When a pipe blank is fed in over the rear end of the mandrel spindle it passes through the bores 504 and 502 of the floating blank feed chuck assembly and during this period both the mandrel end clamp 84 and the feed chuck head 476 are open.

The rear end of the pipe blank, after the blank is fed over the mandrel spindle, is clamped by manual operation of the three-jawed chuck 476. Displacement (feed and reverse feed) of the blank chuck assembly 80 along table frame 78 is accomplished by rotation of feed screw 246 cooperating with the feed nut 442 rigidly held in lower part of the blank feed chuck housing. Rotation of the feed chuck spindle 474 by a predetermined angle is accomplished by means of rotation shaft 240 through a pair of pinions 530 and 454.

As has been hereinbefore noted, the blank feeding chuck head 476 can work in a "rigid" or in a "floating" mode. The drawing illustrates the "floating" mode.

""RIGID" FEED CHUCK OPERATION MODE

During pipe rolling, when the pipe blank which is to be rolled has a wall thickness from 0.4 mm and greater, there is no danger of the ends of pipe blanks meshing, in other words, deforming and/or nesting where the adjacent pipe blanks abut just before reaching the rolling stand. In such a case the floating mode can be omitted so the chuck has no axial spring loading. In the "rigid" mode, regulating spring 516 on the chuck spindle is by-passed by turning nut 520 tight against ring 510, thereby clamping the spindle 474 and eliminating its axial displacement relative to chuck housing 430.

"FLOATING" FEED CHUCK OPERATION MODE

The "floating" mode of the chuck is used when thin-walled pipes of the order of 0.08 to 0.15 mm finished thickness and initial wall thickness 0.4 mm and thinner are to be rolled on the mill.

The chuck components are correctly related if, during a straight pass of the rolling stand (after the feeding and turning is completed), the teeth 500 of stationary jaw 456 will be positioned in alignment with, to permit movement into, the slots between teeth 498 of reciprocable and rotatable jaw 496. The profile of the matched jaws of the exemplary embodiment was determined, taking into consideration an increment of rotation of the pipe blank equal to 72°. Therefore, when the floating chuck is operating in the "floating" mode it is necessary to position the handle 188 (FIGS. 1a and 2a) in a position which provides a 72° rotation during each stepped rotation of the feeding and rotation mechanism 70. The other turning angle, which can be set by the turning angle shift lever 188, is 58°10', and in the exemplary embodiment is only used in "rigid" mode of the blank feed chuck.

When changing from the "rigid" to the "floating" mode, it is necessary to assure that the ratchet jaw teeth on chuck spindle 474 are disposed in such a way that such teeth of the spindle jaw will be directly opposite, axially aligned with the depressions between the teeth of the stationary jaw. When the teeth are properly aligned it is necessary to shift the handle of feed rotation lever 188 to its 72° angle position. Next, the chuck spindle 474 is unclamped by freeing nut 520 so the regulated spring 516 is rendered operative in order than under a certain load the spindle can be displaced in the axial direction relative to the chuck housing.

"Floating" feeding of a succeeding pipe blank by the chuck through the loading of spring 516 has completely eliminated meshing of thin wall pipe blanks when the succeeding blank abuts the preceding blank. Once the new blank has abutted the preceding pipe blank and a rolling cycle has occurred, the blank chuck assembly is fed forward a stepped increment and its chuck is rotated. When the chuck rotates, its ratchet teeth will cam against the stationary teeth to force the chuck head forward the correct distance. The floating action of the chuck thereafter will absorb some of the reaction shock force on the pipe blank as the rolling head starts its cycle of rolling of the pipe blank.

A speeded up return of feeding chuck assembly 80 is accomplished by using the auxiliary electric motor 92, driving in reverse through the shifted condition of the combination friction-jaw clutch (216–224) illustrated in FIG. 3.

The limits of travel of the blank chuck assembly 80 are determined by terminal end switches actuated by the chuck housing operator 556. The switches control conventional circuitry which will shut off power to the main motor 54 and apply its brake at the limit of feed travel and will shut off reverse condition power to the auxiliary motor 92 and apply its brake when the return travel limit is reached.

The invention may be embodied in other specific forms without departing from the spirit or essential characteristics thereof. The present embodiment is therefore to be considered in all respects as illustrative and non-restrictive, the scope of the invention being indicated by the appended claims rather than by the foregoing description, and all changes which come within the meaning and range of equivalency of the claims are therefore intended to be embraced therein.

What is desired to be claimed by Letters Patent is:

1. A pipe blank handling mechanism for feeding pipe blanks into and through a pipe mill comprising: a pipe mandrel rod extending from the input end of the mill through the mill working zone; mandrel rod end clamp means rigidly and accurately fixed on the input end of the mill including a rod end clamp with a through passage enabling feeding of a pipe blank though said end clamp; a pipe blank feed and turning chuck device, with means enabling a floating feed action on the pipe blank, disposed in the mill for travel between said end clamp means and the mill working zone along a path encompassing the axis of said mandrel rod; means in the mill mounting said chuck device for sliding movement along said path; and correlated drive means connected to shift said chuck device along said path and including parallel drive connections respectively to said mandrel rod end clamp and to said chuck device protruding equal rotation of both said mandrel end clamp and said chuck device.

2. A pipe blank handling mechanism for feeding pipe blanks into and through a pipe mill comprising: a pipe mandrel rod extending from the input end of the mill through the mill working zone; mandrel rod end clamp means rigidly and accurately fixed on the input end of the mill including a rod end clamp with a through passage enabling feeding of a pipe blank through said end clamp; a pipe blank feed and turning chuck device, with means enabling a floating feed action on the pipe blank, disposed in the mill for travel between said end clamp means and the mill working zone along a path encompassing the axis of said mandrel rod; means in the mill mounting said chuck device for sliding movement along said path including a housing carriage and slide tracks; means in said housing carriage rotatably mounting said chuck device; said chuck device including a chuck head, a hollow support member axially fixed on said carriage and means mounting said chuck head to said support member enabling limited axial float of said chuck head relative to said carriage; and correlated drive means connected to shift said chuck device along said path and including parallel drive connections respectively to said mandrel rod end clamp and to said chuck device providing equal rotation of both said mandrel end clamp and said chuck device.

3. A pipe blank handling mechanism as defined in claim 2, wherein said mandrel rod end clamp means includes a support fixed on said mill rotatably mounting said end clamp; said end clamp comprises a rotatable body, multiple jaw means arranged in equi-angular spacing around the axis of said clamp, means mounting each said jaw means in said rotatable body for radial shifting, an operating spider coaxially disposed in, non-rotatably fixed to, said axially shiftable relative to said clamp body having an arm for and associated with each of said clamp jaw means, motion transmitting means coacting between associated ones of said arms and of said jaw means enabling selective inward and outward radial positioning of said jaw means upon axial shifting of said spider; each of said jaw means having a comb toothed face disposed toward the axis of said clamp, the comb teeth having structural configurations, transversely disposed relative to the disposition of the clamp axis and adapted to engage complementary formations on the end of said mandrel rod, thereby enabling clamping of said mandrel rod in a non-rotatable and fixed axial position, relative to the clamp jaws; and means enabling bodily rotation of said clamp body by one of said parallel drive connections.

4. A mandrel rod end clamping apparatus for use in a pipe mill comprising: a selectively operable mandrel rod end clamp with a through passage enabling feeding of a pipe blank through the end clamp; support structure rotatably mounting and axially maintaining the position of said end clamp; said end clamp comprising a rotatable body, multiple jaw means arranged in equi-angular spacing around the axis of said clamp, means mounting each said jaw means in said rotatable body for radial shifting, an operating spider coaxially disposed in, non-rotatably fixed to, and axially shiftable relative to said clamp body having an arm for and associated with each of said clamp jaw means, motion transmitting means coacting between associated ones of said arms and of said jaw means enabling selective inward and outward radial positioning of said jaw means upon axial shifting of said spider; each of said jaw means having a comb tooth face disposed toward the axis of said clamp, the comb teeth having structural configurations transversely disposed relative to the disposition of the clamp axis and adapted to engage complementary formations on the end of a mandrel rod, thereby enabling clamping of a mandrel rod in a non-rotatable and fixed axial position relative to the clamp jaws; and means enabling a rotational drive input to said clamp body.

5. A mandrel rod end clamp apparatus as defined in claim 4, wherein said structural configurations of said teeth provide flat end faces on each tooth and each tooth is disposed normal to and offset from the clamp axis.

6. A mandrel rod end clamp apparatus as defined in claim 4, wherein said means enabling drive input includes an input pinion, said rotatable body has a hollow spindle carrying a driven pinion, said support structure comprises a fixed housing with means journalling said input pinion and means journalling the spindle of said rotatable body in axially fixed dispositions on parallel axes with said two pinions meshed.

7. A mandrel rod end clamp apparatus as defined in claim 4, wherein said rotatable body includes an enlarged rear portion, with radially disposed axial slots constituting radial slideways for said jaw means and axial slideways for said spider arms, and a rear cover; said enlarged portion and said rear cover providing means embracing portions of said jaw means to axially maintain yet permit radial shifting of said jaw means.

8. A mandrel rod end clamp apparatus as defined in claim 7, wherein said operating spider has a hollow spindle; said rotatable body has a forwardly directed hollow spindle; said support structure has a fixed housing with means to journal said body spindle in axially fixed disposition relative to said housing; gear means in said housing are drive connected to enable a rotational drive of said body; said body spindle includes anti-friction means to coaxially reciprocally mount and guide the operating spider spindle; and means on the end of said spider spindle enables selective reciprocable positioning of said spider.

9. A mandrel rod end clamp apparatus as defined in claim 7, wherein said jaw means are channel shaped with side flanges projecting away from the clamp axis and lateral end flanges disposed between said enlarged portion and said rear cover; and the arms of said operating spider slidably fit between the side flanges of said channel shaped jaw means.

10. A mandrel rod end clamp apparatus as defined in claim 9, wherein each jaw means and associated spider arm include cooperating camming means enabling opening and closing shift of said jaw means only upon axial reciprocation of said operating spider.

11. A mandrel rod end clamp apparatus as defined in claim 10, wherein said configurations of said teeth provide flat end faces on each tooth and each tooth is disposed normal to and offset from the clamp axis.

12. A pipe blank feed and rotating apparatus for use in a pipe mill comprising: a chuck device; a chuck housing carriage adapted to be reciprocated along a mill table feed path and maintained non-rotatable relative to the mill table; means in said carriage rotatably mounting said chuck device; said chuck device including a chuck head, and means mounting said chuck head enabling limited axial float of said chuck head relative to said carriage during feeding action.

13. A pipe blank feed and rotating apparatus for use in a pipe mill comprising: a chuck device; a chuck housing carriage adapted to be reciprocated along a mill table feed path and maintained non-rotatable relative to the mill table; means in said carriage rotatably mounting said chuck device; said chuck device including a chuck head, and means mounting said chuck head enabling limited axial float of said chuck head relative to said carriage, and having selectively operable means to enable and disable said axial floating action.

14. A pipe blank feed and rotating apparatus as defined in claim 12, wherein said means mounting said chuck head includes a hollow support member coaxial with said rotatable mounting means.

15. A pipe blank feed and rotating apparatus for use in a pipe mill comprising: a chuck device including a chuck head; a chuck housing carriage adapted to be reciprocated along a mill table feed path and maintained non-rotatable relative to the mill table; means in said carriage rotatably mounting said chuck device; said chuck device including a chuck head, and means mounting said chuck head enabling limited axial float of said chuck head relative to said carriage and including a hollow support member coaxial with said rotatable mounting means; said means in said carriage which rotatably mounts said chuck device further including hollow shaft means axially fixed in and journalled for rotation relative to said carriage, means within said hollow shaft means providing non-rotatable and reciprocal mounting of said hollow chuck support member, cooperating abutment means on said hollow shaft means and said hollow support member providing fore and aft limits of reciprocable shift of said hollow support member, and a resilient biasing means disposed between said hollow shaft means and said hollow support member exerts a biasing force tending to maintain said hollow support member at its forward limit position, to enable said limited axial float of said chuck head.

16. A pipe blank feed and rotating apparatus as defined in claim 15, wherein a releasable clamping device carried by said hollow shaft means is adapted to positively engage with and clamp both of said hollow shaft means and said hollow support member together in a forward limit position preventing axial shift of said hollow support member in a direction opposing the resilient bias force.

17. A pipe blank feed and rotating apparatus as defined in claim 15, wherein said resilient biasing means is a coiled compression spring disposed with said hollow shaft means and seated over one end of and against a shoulder means on said hollow support member.

18. A pipe blank feed and rotating apparatus for use in a pipe mill comprising: a chuck device; a chuck housing carriage adapted to be reciprocated along a mill table feed path and maintained non-rotatable relative to the mill table; means in said carriage rotatably mounting said chuck device; said chuck device including a chuck head, and means mounting said chuck head enabling limited axial float of said chuck head relative to said carriage and including a hollow support member coaxial with said rotatable mounting means; cooperating relatively rotatable camming means provided on adjacent portions of said carriage and said hollow support member; in one axial limit position of said chuck head, said camming means are disengaged and in the other axial limit position of said chuck head and during a major portion of the axial shifting range of floating movement of the chuck head said camming means are engaged; said cooperating camming means, when engaged, being adapted to positively axial shift said chuck head away from said carriage during a rotational movement of said chuck head.

19. A pipe blank feed and rotating apparatus as defined in claim 18, wherein said cooperating camming means comprise cam teeth on said carriage and an equal number of complementary cam teeth fixed on said hollow support member; the incremental angle of rotation of said chuck device during each feed step is equal to 360° divided by the number of teeth on each of said carriage and said hollow support member; and said hollow support member is rotationally arranged in said carriage so that upon completion of each increment of rotation said chuck device is again in an angular position relative to said carriage to permit axial float.

20. A pipe blank feed and rotating apparatus as defined in claim 19, wherein said camming teeth are on side faces of facing plate members secured respectively on said carriage and on said hollow support member.

21. Pipe blank handling mechanism for feeding pipe blanks into and through a pipe mill comprising: a pipe mandrel rod extending from the input end of the mill through the mill working zone; mandrel rod end clamp means rigidly and accurately fixed on the input end of the mill including a rod end clamp with a through passage enabling feeding of a pipe blank through said end clamp; a pipe blank feed and turning chuck device, with means enabling a floating feed action on the pipe blank, disposed in the mill for travel between said end clamp means and the mill working zone along a path encompassing the axis of said mandrel rod; means in the mill mounting said chuck device for sliding movement along said path; and correlated drive means connected to shift said chuck device along said path and including parallel drive connections respectively to said mandrel rod end clamp and to said chuck device providing equal rotation of both said mandrel end clamp and said chuck device; said means mounting said chuck device including a housing carriage and slide tracks; means in said carriage rotatably mounting said chuck device; said chuck device includes a chuck head, a hollow support member secured on said chuck and mounted on said carriage enabling limited axial float of said chuck head relative to said carriage; cooperating relatively camming means provided on adjacent portions of said carriage and said hollow support member whereby, in one axial limit position of said chuck head; said camming means are disengaged and in the other axial limit position of said chuck head and during a major portion of the axial shifting range of floating movement of the chuck head, said camming means are engaged, and whereby said cooperating camming means, when engaged are adapted to positively axial shift said chuck head away from said carriage during a rotational movement of said chuck head.

* * * * *

UNITED STATES PATENT OFFICE
CERTIFICATE OF CORRECTION

Patent No. 3,680,345         Dated August 1, 1972

Inventor(s) Alexandr Ivanovich Tselikov et al

It is certified that error appears in the above-identified patent and that said Letters Patent are hereby corrected as shown below:

Claim 18, column 17, line 23 change "axial" to --axially--.

Claim 21, column 18, line 28, after "relatively" insert --rotatable--. (See claim 18, column 17, line 15 for support for missing word.)

, line 36, change "axial" to --axially--.

Signed and sealed this 9th day of July 1974.

(SEAL)
Attest:

McCOY M. GIBSON, JR.
Attesting Officer

C. MARSHALL DANN
Commissioner of Patents